United States Patent [19]

Elter et al.

[11] Patent Number: 4,752,439
[45] Date of Patent: Jun. 21, 1988

[54] SAFETY ENCLOSURE COOLING SYSTEM FOR GAS COOLED HIGH TEMPERATURE REACTORS

[75] Inventors: Claus Elter, Duerkheim; Josef Schoening, Hambruecken; Winfried Wachholz, Gorxheim-Druesel; Ulrich Weicht, Weinheim, all of Fed. Rep. of Germany

[73] Assignee: Hochtemperatur-Reaktorbau GmbH, Fed. Rep. of Germany

[21] Appl. No.: 724,959

[22] Filed: Apr. 22, 1985

Related U.S. Application Data

[63] Continuation of Ser. No. 425,332, Sep. 28, 1982.

[30] Foreign Application Priority Data

Oct. 22, 1981 [DE] Fed. Rep. of Germany ....... 3141892

[51] Int. Cl.⁴ .............................................. G21C 9/00
[52] U.S. Cl. ................................... 376/299; 376/203; 376/293; 376/406; 376/461
[58] Field of Search ................ 376/282, 283, 287, 290, 376/293, 294, 295, 296, 298, 381, 382, 383, 384, 391, 392, 393, 394, 406, 203, 461, 299

[56] References Cited

U.S. PATENT DOCUMENTS

| | | | |
|---|---|---|---|
| 2,863,815 | 12/1958 | Moore et al. | 376/299 |
| 2,946,732 | 7/1960 | Wootton | 376/391 |
| 3,115,450 | 12/1963 | Schanz | 376/283 |
| 3,149,046 | 9/1964 | Boyd | 376/295 |
| 3,207,671 | 9/1965 | Kornbichler | 376/293 |
| 3,266,999 | 8/1966 | Wood et al. | 376/406 |
| 3,372,092 | 3/1968 | Margen | 376/295 |
| 3,461,034 | 8/1969 | Fortescue | 376/296 |
| 3,497,421 | 2/1970 | Thome | 376/296 |
| 3,888,730 | 6/1975 | Jackson | 376/290 |
| 3,928,133 | 12/1975 | Schabert et al. | 376/287 |
| 3,929,567 | 12/1975 | Schabert et al. | 376/293 |
| 4,061,534 | 12/1977 | Jackson | 376/298 |
| 4,404,165 | 9/1983 | Hesky et al. | 376/298 |
| 4,508,677 | 4/1985 | Craig et al. | 376/406 |

FOREIGN PATENT DOCUMENTS

| | | | |
|---|---|---|---|
| 1227160 | 1/1960 | Fed. Rep. of Germany . | |
| 2623978 | 12/1977 | Fed. Rep. of Germany | 376/299 |
| 3009390 | 9/1981 | Fed. Rep. of Germany | 376/299 |
| 6602176 | 8/1967 | Netherlands | 376/298 |

OTHER PUBLICATIONS

Gill, the Design and Construction of the Biological Shield at Hunterson, G.E.C. Atomic Energy Review, Sep., 1959, pp. 77–85.
Journal of the British Nuclear Energy Society, 1975, vol. 14, No. 2, p. 111.

Primary Examiner—Deborah L. Kyle
Assistant Examiner—Richard W. Wendtland
Attorney, Agent, or Firm—Robert J. Koch

[57] ABSTRACT

A gas cooled high temperature nuclear reactor utilizes an independent cooling system for the safety enclosure surrounding the reactor vessel. The cooling system comprises means for circulating cooling medium at least on the reactor side of a concrete safety enclosure shell and a separate closed cooling loop for circulation of separate cooling medium through a reservoir of the first cooling medium and to the outside of the entire nuclear reactor installation.

17 Claims, 2 Drawing Sheets

SAFETY ENCLOSURE COOLING SYSTEM FOR GAS COOLED HIGH TEMPERATURE REACTORS

This application is a continuation, of application Ser. No. 425,332, filed Sept. 28, 1982.

BACKGROUND OF THE INVENTION

1. Field of the Invention

The invention concerns gas cooled high temperature reactors having a cylindrical steel pressure vessel, heat exchanger devices, cooling gas circulation devices and circulating blowers.

2. Background of the Prior Art

The state-of-the-art includes installations wherein a high temperature reactor for the nuclear generation of heat and the devices serving the utilization of the heat obtained are installed together in a pressure vessel. The heat is removed by means of a cooling gas which is being circulated with the aid of blowers in a closed loop or primary loop through the reactor core and the heat exchanger devices. For the removal of the residual heat, special devices, such as auxiliary heat exchangers and auxiliary blowers are often provided It is also possible to eliminate these special devices by means of a particular arrangement and layout of the primary loop components.

Thus for example in the thorium high temperature reactor (THTR-300), the heat exchangers and the blowers together with the pipe circuits on the secondary side and their components are laid out so that the entire secondary heat is removed by means of the operating systems of the heat exchangers on the primary side The flow of the cooling gas from top to bottom through the reactor core and from bottom to top through the heat exchangers in this case is similar to that in normal operation. To assure the removal of secondary heat, however, the blowers must at all times be ready to function so that the area of the cold gas will not be endangered by the hot gas rising in free convection.

In a further nuclear reactor installation with a gas cooled high temperature reactor, the so-called AVR plant, the heat exchanger is arranged above the nuclear reactor and the cooling gas flows from bottom to top both through the reactor core and through the heat exchanger. In the event of a failure of the blower located underneath the core, the residual heat is removed by natural convection to the structures surrounding the reactor core. The latter include in addition to a reflector jacket of graphite, a carbon brick enclosure surrounding the graphite jacket and providing shielding and thermal insulation. To safely contain the fission products released, the aforementioned structures are surrounded by a double, gas-tight steel pressure vessel. A layer of magnetite and limonite between the two steel pressure vessels serves as a biological shield.

In the above mentioned THTR-300 the function of the biological shield is effected by the prestressed concrete pressure vessel, which houses in a centercavity, the reactor core and the heat exchangers. The prestressed concrete pressure vessel not only serves as the radiation shield, but also provides a complete, pressure resistant containment of the nuclear reactor installation.

SUMMARY OF THE INVENTION

The present invention is based on a nuclear reactor installation of the type described hereinabove and arranged in a steel pressure vessel. It is an object of the invention to provide such an installation that safely protects the outside and the environment against radiation and the consequences of accidents which may occur within the plant. Another object is to assure the removal of secondary heat in the event of an accident.

According to the invention, the nuclear reactor installation is characterized in that the steel pressure vessel is tightly enclosed in a safety enclosure comprising two essentially cylindrical concrete shells in a spaced apart arrangement, a concrete cover monolithically joined with the outer concrete shell and a cantilever ring monolithically joined with both concrete shells and supporting the steel pressure vessel and a concrete cooling system in the innerconcrete shell. The concrete cooling system operates by natural means and comprises cooling water circulating in a closed loop and a second cooling water system to provide for the recooling of the cooling water circulating in the concrete cooling system.

An adequate radiation shielding of the nuclear reactor and the components of the primary loop is obtained by means of the safety enclosure according to the invention. The enclosure also functions as a biological shield. Secondly, in the case of a possible release of radiation from the steel pressure vessel, the safety enclosure assures the safe containment of the installation against leakage from the primary loop. The safety enclosure thereby forms a containment barrier for the cooling gas in the steel pressure vessel and an additional barrier to retain fission products. (A first barrier to retain fission products is the fuel elements themselves. A nuclear reactor with spherical fuel elements contains the fissionable substance in the form of coated particles.) By means of the safety enclosure according to the invention, leakages of the primary loop may be retained until a controlled removal of the cooling gas to the environment through filters or a gas purification installation is assured.

The safety enclosure further protects the nuclear reactor installation against external effects. These effects may consist, for example, of earthquakes, aircraft crashes or pressure waves in the case of explosions. At the same time, the safety enclosure serves as a supporting structure of the steel pressure vessel. The outer concrete shell has the further function of a protective reactor building, while the inner concrete shell provides protection against debris and fragments.

In order to enable the safety enclosure to perform these different functions, the concrete material of the enclosure must be protected against excessive heating. For this reason, a concrete cooling system is provided within the inner concrete shell. In normal operation, the concrete cooling system removes the heat generated in the concrete by radiation. The heat loss of the steel pressure vessel is also removed by the concrete cooling system. Heat is transferred from the steel pressure vessel primarily by thermal radiation while it is removed from the concrete by direct contact.

This concrete cooling system is further used according to the invention for the removal of the secondary heat. In the event of an accident, for example, the devices normally eliminating the secondary heat are rendered ineffective and the concrete cooling system provides a backup. Initially, the devices for the removal of secondary heat consist of the heat exchanger blower units with the operational secondary loop and possibly an auxiliary cooling system. Even in the case of a failure of the blowers, the removal of secondary heat on the primary side may be assured if the cooling gas pressure in the primary circuit is high enough so that natural convection is adequate and may be maintained as such. If, however, the heat sink on the primary side is eliminated, the secondary heat is conducted according to the invention by means of natural convection, conduction and radiation of the steel pressure vessel. The heat is then transferred from the steel pressure vessel essentially by radiation to the concrete cooling system located in the inner concrete shell. Even in the case of the loss of cooling gas (pressure relief incident) and the failure of all cooling in the primary loop, the secondary heat is transferred from the surface of the steel pressure vessel to the concrete cooling system. In this event, no increased release of fission products by the fuel elements is experienced.

The concrete cooling system comprises preferably an elevated annular reservoir placed onto the inner concrete shell and maintained under atmospheric pressure, together with ascending pipes and downpipes. Ascending pipes are arranged on the side facing the steel pressure vessel and the downpipes are arranged on the side facing the outer concrete shell of the inner concrete shell. The recooling of the water circulating in the concrete cooling system is effected by a second cooling water system, which removes the heat generated to the elevated reservoir and then to the outside.

In the event of partial or complete failure of the auxiliary cooling of the concrete cooling system, the water content of the elevated reservoir and the pipe system evaporates at a rate of approximately 2 to 3 t/h. Depending on the volume and water supply of the elevated reservoir, the removal of secondary heat may thereby be assured for several days without any active measures.

The temperatures of the steel pressure vessel remain in such a hypothetical incident clearly under 400° C.

Preferably, a device for the continuous supply of water is provided on the elevated reservoir. By the actuation of this device either the removal of the secondary heat may be continued following the evaporation of the concrete cooling system or the concrete cooling system may be operated with a higher heat removal capacity.

It is appropriate to connect the elevated reservoir with a blow-off line and to arrange a pressure relief valve in the blow-off line.

As the transfer of heat from the steel pressure vessel to the ascending pipes of the concrete cooling system takes place essentially by radiation, it is advantageous to equip the ascending pipes with azimuthal fins or a finned wall. Cooling plates of a cast material maybe applied further to the ascending pipes.

In order to be able to perform maintenance and repair work on the primary loop components installed within the steel pressure vessel, such as heat exchangers and circulating blowers, several large passages are provided conveniently in the safety enclosure. These passages permit the dismantling of the components. The passages are closed off by removable pressure resistant and gas-tight covers, placed onto the outer concrete shell or set into it.

In its center area, the inner concrete shell may be equipped with a thickened part directed inwardly. This thickened part is preferably in the form of a flange upon which a supporting ring is resting. The supporting ring is mounted on the jacket of the steel pressure vessel. The supporting ring has the function of securing the steel pressure vessel in case of exposure to an earthquake. The pressure vessel is thereby supported only by the inner concrete shell. Additional support on the outer concrete shell would result in a direct impact of a crashing aircraft on the steel pressure vessel.

The safety enclosure in turn may rest on concrete support rings joined monolithically with both concrete shells as well as on the cantilever ring upon which the steel pressure vessel rests.

The annular space between the two concrete shells, which is accessible to a limited extent during operation, may beused advantageously as a working space.

BRIEF DESCRIPTION OF THE DRAWINGS

An embodiment of the nuclear reactor installation according to the invention is schematically represented in the drawing. In the drawing:

FIG. 3 shows a high temperature reactor and heat exchangers all housed in a cylindrical steel pressure vessel.

DETAILED DESCRIPTION OF PREFERRED EMBODIMENTS

Figure 1:
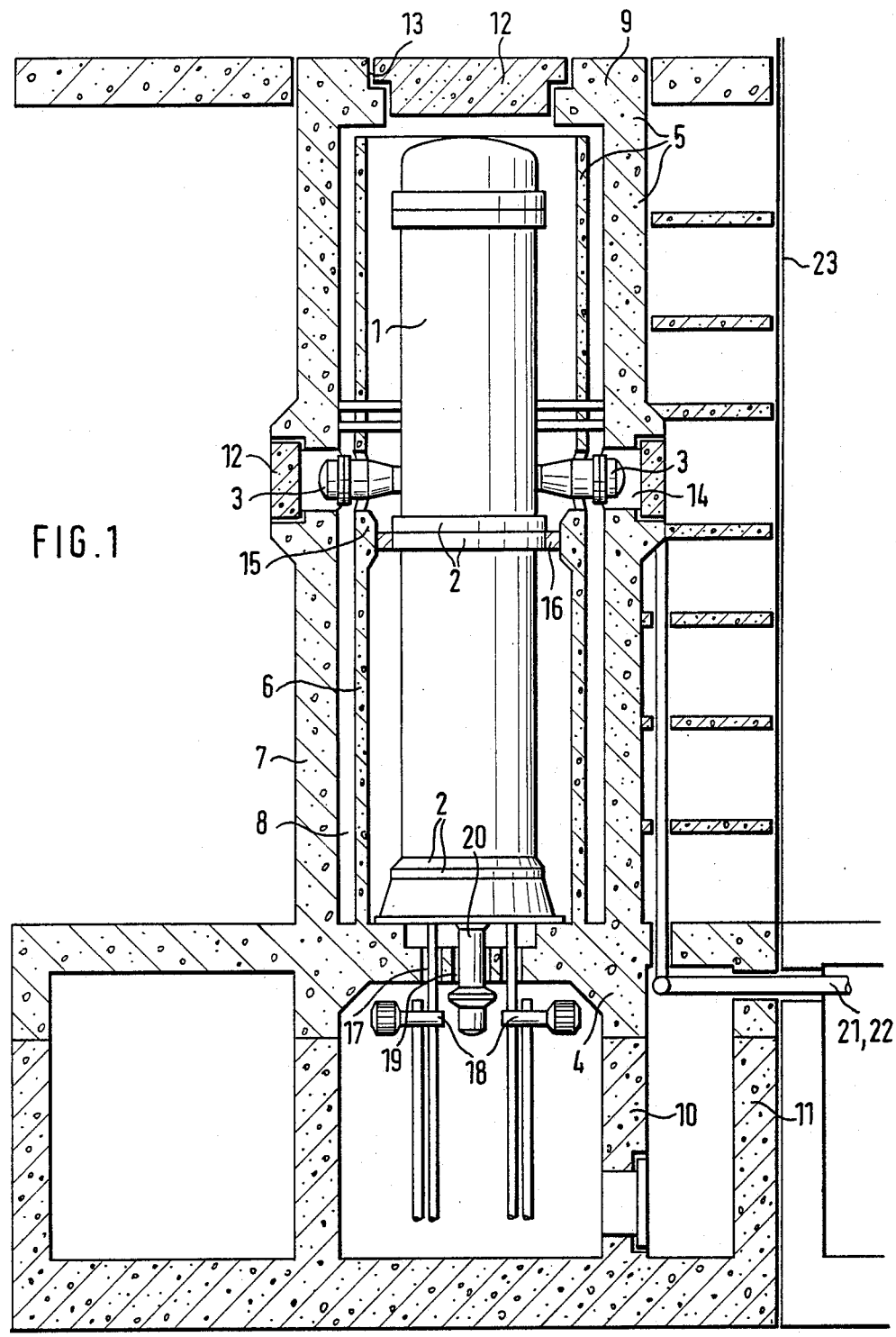
FIG. 1 shows the nuclear reactor installation in a longitudinal cross section, but without the concrete cooling system.

FIG. 1 shows a multiple part cylindrical steel pressure vessel 1, the individual parts of which are joined together at the flange 2. A nuclear reactor is installed in the steel pressure vessel 1. The reactor in FIG. 3 comprises a high temperature small reactor 33 located in the lower part of the vessel and having a capacity of 100 MWe, and a heat utilization system arranged in the upper part of the vessel. The heat utilization system comprises a plurality of heat exchange units or generators 34 and circulating blowers 3 following the generators in sequence. The heat exchanger units or generators are conventionally installed. The blowers 3 are mounted laterally on the upper part of the steel pressure vessel 1. The pressure vessel 1 rests on a cantilever ring 4 made of concrete.

A safety enclosure 5 is arranged tightly around the steel pressure vessel 1. The enclosure 5 comprises two essentially cylindrical concrete shells, the inner concrete shell 6 and the outer concrete shell 7, together with a concrete cover 9 monolithically joined with the two concrete shells. The cantilever ring 4 is also integrated into the safety enclosure 5. The safety enclosure 5 rests on two support rings 10 and 11 made of concrete. It is again joined monolithically with the rings. Between the two concrete shells 6 and 7, there is an annular space 8, which is accessible to a limited extent and may be used as a work space.

Several large passages are provided in the concrete cover 9 and in the center jacket area of the safety enclosures. These passages are closed off with removable pressure resistant and gas-tight covers 12. The passage 13 in the concrete cover 9 permits access to the steam generators in the heat utilization system and makes dismantling of these components also possible. The passages 14 provided in the jacket area of the safety enclosure 5 provide access to the inner concrete shell 6 to the blowers 3. The outer concrete shell 7 into which the covers 12 are set (in FIG. 1 one of the covers 12 has been removed) is reinforced in the area of the passage 14. The circulating blowers 3 may be removed through the passages 14 or maintenance and repair work may be performed on them.

In the area of the center flange 2 of the steel pressure vessel 1, the inner concrete shell 6 has thickened part 15 projecting in the inward direction. A ring 16 rests on the part 15. It is set onto the steel pressure vessel 1. The ring 16 secures the steel pressure vessel 1 against earthquakes.

In the cantilever ring 4, passages 17 are provided for a shutdown system 18, which comprises a plurality of absorber rods and their drive devices. A central passage 19 receiving a pebble removal tube 20 is also provided if the small HT reactor is operated with spherical fuel elements. The water supply lines 21 and the live steam lines 22 of the steam generators are installed at the bottom and outside the safety enclosure 5 in the reactor housing 23 surrounding the safety enclosure, passing horizontally through the support ring 11 to the outside.

For a nuclear reactor installation with the abovementioned capacity, with four steam generators, the two concrete shells 6 and 7, together with the annular space 8, have a thickness of approximately 2.70 m. This includes a wall thickness of the inner concrete shell of 0.70 m and a width of 0.80 m of the annular space 8.

Figure 2:
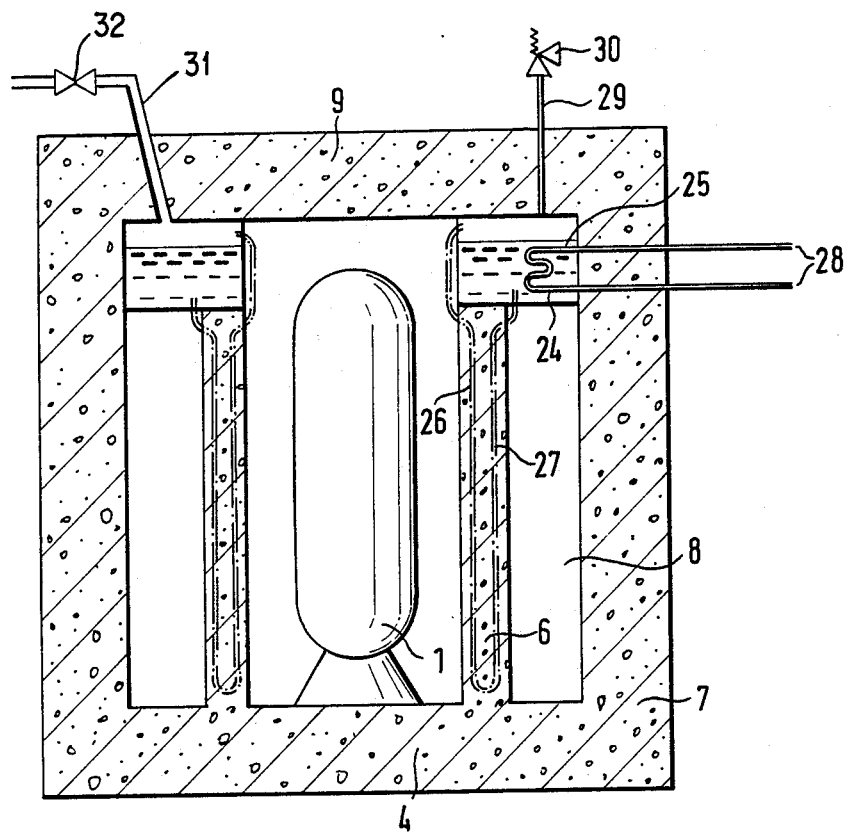
FIG. 2 shows a reduced and highly simplified representation of the reactor installation with the concrete cooling system.

To protect the inner concrete shell 6 against excessive thermal stresses, the safety enclosure 5 has a concrete cooling system 24. This system also has the simultaneous function of removing the secondary heat in case of a failure of the secondary heat removal devices on the primary side in the nuclear reactor installation. The concrete cooling system 24, operated with natural circulation is shown in FIG. 2.

The concrete cooling system 24 includes an annular elevated reservoir 25 which is under atmospheric pressure. In addition, a plurality of ascending pipes 26 and downpipes 27 form a piping system wherein cooling water circulates in a closed loop. The closed loop is connected with the elevated reservoir 25. The elevated reservoir 25, which contains approximately 100 m³ water is set onto the inner concrete shell 6. It is connected with a second cooling system 28, wherein cooling water is again circulating. This second cooling water system transfers the heat generated in the elevated reservoir 25 to the outside.

The ascending pipes 26 are installed within the inner concrete shell 6 on its side facing the steel pressure vessel 1. The downpipes 27 are on the side facing the outer concrete shell 7.

The ascending pipes 26 may be equipped with azimuthal fins or a finned wall (not shown). A blow-off line 29 leading to the outside from the safety enclosure 5 is connected with the elevated reservoir 25. A pressure relief valve 30 is arranged in the blow-off line. By means of an inlet line 31 with a valve 32 for the supply of water, it is possible at any time to replenish the water in the elevated reservoir 25.

When the cooling system operates for the removal of secondary heat from the primary cooling loop, the heat is transferred essentially by radiation to the inner concrete shell 6 of the safety enclosure 5. The heat is received by the water rising in the ascending pipes 26 by heat conduction. The heat is transported within the elevated reservoir 25 and thereby transferred to the second cooling water system 28.

In case of a failure of the cooling water system 28, the water is heated in the elevated reservoir 25, but due to evaporation in reservoir 25 the removal of the secondary heat may be maintained for 2 to 3 days. If it is necessary to provide a longer period of time, the elevated reservoir 25 may also be refilled by means of the inlet line 31.

The above description describes a preferred embodiment of the invention. It is to be understood however, that the invention is not limited to any single embodiment or feature, but should be construed to cover all modifications and alternative embodiments falling within the scope of the invention as defined by the claims which follow.

What is claimed is:

1. A gas cooled high temperature reactor comprising:
   a pressure-vessel housing a reactor core and a cooling circuit comprising a plurality of heat exchangers and circulating blowers;
   a first cylindrical concrete shell surrounding and spaced from said vessel, said first cylindrical concrete shell defining a first annular space around said pressure-vessel;
   a second cylindrical concrete shell surrounding said first cylindrical concrete shell and defining a second annular space between said first and second shells;
   means for removal of decay heat in the event of failure of said plurality of heat exchangers and for cooling said first cylindrical concrete shell through natural convection, said means including an elevated reservoir for retaining a cooling medium and a plurality of ascending pipes and descending pipes within said first shell in fluid communication with said reservoir and forming a closed loop for conducting said concrete-cooling medium through said first shell;
   means cooperating with said second cylindrical concrete shell to enclose said pressure-vessel and said first cylindrical concrete shell; and
   means for cooling said cooling medium, said means including a second closed cooling loop.

2. The gas cooled high temperature reactor of claim 1 wherein said means for cooling said closed cooling loop comprises a conduit for conducting auxiliary cooling medium through said reservoir.

3. The gas cooled high temperature reactor of claim 2 wherein said reservoir is an annular shaped reservoir supported by said first cylindrical concrete shell.

4. The gas cooled high temperature reactor of claim 3 wherein a unitary concrete member cooperates with said second cylindrical concrete shell to enclose said pressure-vessel.

5. The gas cooled high temperature reactor of claim 4 wherein said unitary concrete member rests on a cantilevered concrete ring.

6. The gas cooled high temperature reactor of claim 5 wherein said pressure vessel is supported by a concrete base.

7. The gas cooled high temperature reactor of claim 6 wherein said cantilevered concrete ring, said second cylindrical concrete shell and said concrete base form a single unitary structure enclosing said first cylindrical concrete shell and said pressure vessel.

8. The gas cooled high temperature reactor of claim 7 wherein said concrete-cooling medium comprises water.

9. The gas cooled high temperature reactor of claim 8 wherein said reservoir contains water at atmospheric pressure.

10. The gas cooled high temperature reactor of claim 1 wherein said plurality of vertically ascending pipes are arranged within said first concrete shell at the side of said first concrete shell facing said steel pressure vessel, and said plurality of vertically descending pipes are arranged within said first concrete shell at the side of said first concrete shell facing said second concrete shell.

11. The gas cooled high temperature reactor of claim 10 further comprising means for supplying water to said reservoir in addition to the water in said reservoir and cooling conduit.

12. The gas cooled high temperature reactor of claim 11 further comprising a pressure release line for said reservoir.

13. The gas cooled high temperature reactor of claim 12 further comprising a plurality of gas-tight passageways having removable pressure resistant gas-tight covers.

14. The gas cooled high temperature reactor of claim 13 wherein said steel pressure vessel is supported in said first cylindrical concrete shell by a support ring attached to a thickened area of said first cylindrical concrete shell.

15. The gas cooled high temperature reactor of claim 14 wherein said first cylindrical concrete shell forms a unitary structure with said concrete base.

16. The gas cooled high temperature reactor of claim 15 wherein said concrete base is supported by concrete support rings.

17. The gas cooled high temperature reactor of claim 16 wherein said concrete base and said concrete support rings form a unitary structure.

* * * * *